(12) United States Patent
Kim (10) Patent No.: US 10,632,552 B2
(45) Date of Patent: Apr. 28, 2020

(54) SAW BLADE HAVING NOISE AND STRESS-REDUCTION STRUCTURE

(71) Applicant: SHINHAN DIAMOND IND. CO., LTD., Incheon (KR)

(72) Inventor: Shin kyung Kim, Seoul (KR)

(73) Assignee: SHINHAN DIAMOND IND. CO., LTD., Incheon (KR)

( * ) Notice: Subject to any disclaimer, the term of this patent is extended or adjusted under 35 U.S.C. 154(b) by 131 days.

(21) Appl. No.: 15/736,719

(22) PCT Filed: Jun. 15, 2016

(86) PCT No.: PCT/KR2016/006346
§ 371 (c)(1),
(2) Date: Dec. 14, 2017

(87) PCT Pub. No.: WO2016/204506
PCT Pub. Date: Dec. 22, 2016

(65) Prior Publication Data
US 2018/0154471 A1    Jun. 7, 2018

(30) Foreign Application Priority Data

Jun. 15, 2015 (KR) .......................... 10-2015-0084202

(51) Int. Cl.
*B23D 61/02* (2006.01)
*B23D 61/18* (2006.01)
*B28D 1/12* (2006.01)
*B28D 1/04* (2006.01)

(52) U.S. Cl.
CPC ............ *B23D 61/18* (2013.01); *B23D 61/021* (2013.01); *B28D 1/04* (2013.01); *B28D 1/121* (2013.01); *B23D 61/026* (2013.01); *B23D 61/028* (2013.01)

(58) Field of Classification Search
CPC . B28D 1/121; B24D 5/06; B24D 5/10; B23D 61/02; B23D 61/028; B23D 61/026
USPC .................. 125/13.01, 15; 451/541, 542, 449
See application file for complete search history.

(56) References Cited

U.S. PATENT DOCUMENTS

| 4,345,579 A | 8/1982 | Eichenlaub et al. |
| 4,665,887 A | 5/1987 | Shiga |
| 5,697,359 A * | 12/1997 | Okanishi .............. B23D 61/026 125/15 |

(Continued)

FOREIGN PATENT DOCUMENTS

| JP | 2012-210665 A | 11/2012 |
| JP | 2015-39760 A | 3/2015 |

(Continued)

OTHER PUBLICATIONS

International Search Report and Written Opinion, dated Sep. 8, 2016, for International Application No. PCT/KR2016/006346, 8 pages. (with English Translation of Search Report).

*Primary Examiner* — Robert A Rose
(74) *Attorney, Agent, or Firm* — Seed IP Law Group LLP (57) ABSTRACT

A saw blade is provided having a noise and stress-reduction structure, the saw blade having a structure in which a plurality of diamond segments are mounted at a first unit and the first unit has a second unit, thereby reducing the noise generated during a cutting operation, while increasing heating performance with a relatively simple configuration, and simultaneously dispersing impact stress so as to prevent the occurrence of cracks.

14 Claims, 8 Drawing Sheets

(56) References Cited

U.S. PATENT DOCUMENTS

| | | | |
|---|---|---|---|
| 5,829,423 | A | 11/1998 | Benz |
| 6,478,021 | B1 | 11/2002 | Kim et al. |
| 6,526,959 | B1 | 3/2003 | Lee et al. |
| 6,638,153 | B2 | 10/2003 | Lee et al. |
| 6,872,133 | B2 | 3/2005 | Lee et al. |
| 7,946,907 | B2 * | 5/2011 | Heyen .................. B23D 61/021 125/13.01 |
| 2015/0056901 | A1 | 2/2015 | Aoki et al. |

FOREIGN PATENT DOCUMENTS

| | | |
|---|---|---|
| KR | 1996-0021320 A | 7/1996 |
| KR | 0141337 B1 | 3/1998 |
| KR | 2001-0029021 A | 4/2001 |
| KR | 2001-0056906 A | 7/2001 |
| KR | 2002-0067855 A | 8/2002 |
| KR | 2003-0011144 A | 2/2003 |
| KR | 2003-0025425 A | 3/2003 |
| KR | 20-0312621 Y1 | 5/2003 |
| KR | 10-2004-0051064 A | 6/2004 |
| KR | 10-2004-0102965 A | 12/2004 |
| KR | 10-2005-0101943 A | 10/2005 |
| KR | 10-0575849 B1 | 4/2006 |
| WO | 96/07521 A1 | 3/1996 |
| WO | 2009/094377 A1 | 7/2009 |

\* cited by examiner

(Prior Art)

【FIG. 6】

(Prior Art)

【FIG. 7】

(Prior Art)

【FIG. 8】

(Prior Art)

[FIG. 9]

(Prior Art)

(Prior Art)

SAW BLADE HAVING NOISE AND STRESS-REDUCTION STRUCTURE

BACKGROUND

Technical Field

The present disclosure relates to a saw blade having a noise and stress reduction structure, and, more particularly, to a saw blade having a noise and stress reduction structure which can reduce noise during cutting and have high heat dissipation efficiency with a relatively simple configuration while dispersing impact stress to suppress cracking.

Description of the Related Art

Referring to FIGS. 5 to 10, a circular saw blade used for cutting stone or concrete includes a thin disc 1 formed of steel or the like and a segment 2 formed of diamond and a binder (metal, resin, vitrified bond) and attached to a portion or the entirety of an outer circumference of the disc 1 to cut a workpiece.

Noise generated during cutting with such saw blade is loud enough to interfere with communication around a workplace, and a person exposed to the noise for a long time can lead to hearing loss.

In recent years, international noise regulations are being strengthened. As cutting operations with such saw blade in residential areas or on roads are subject to environmental regulation, various studies focusing on developing a saw blade capable of reducing cutting noise have been actively conducted.

Figure 5:
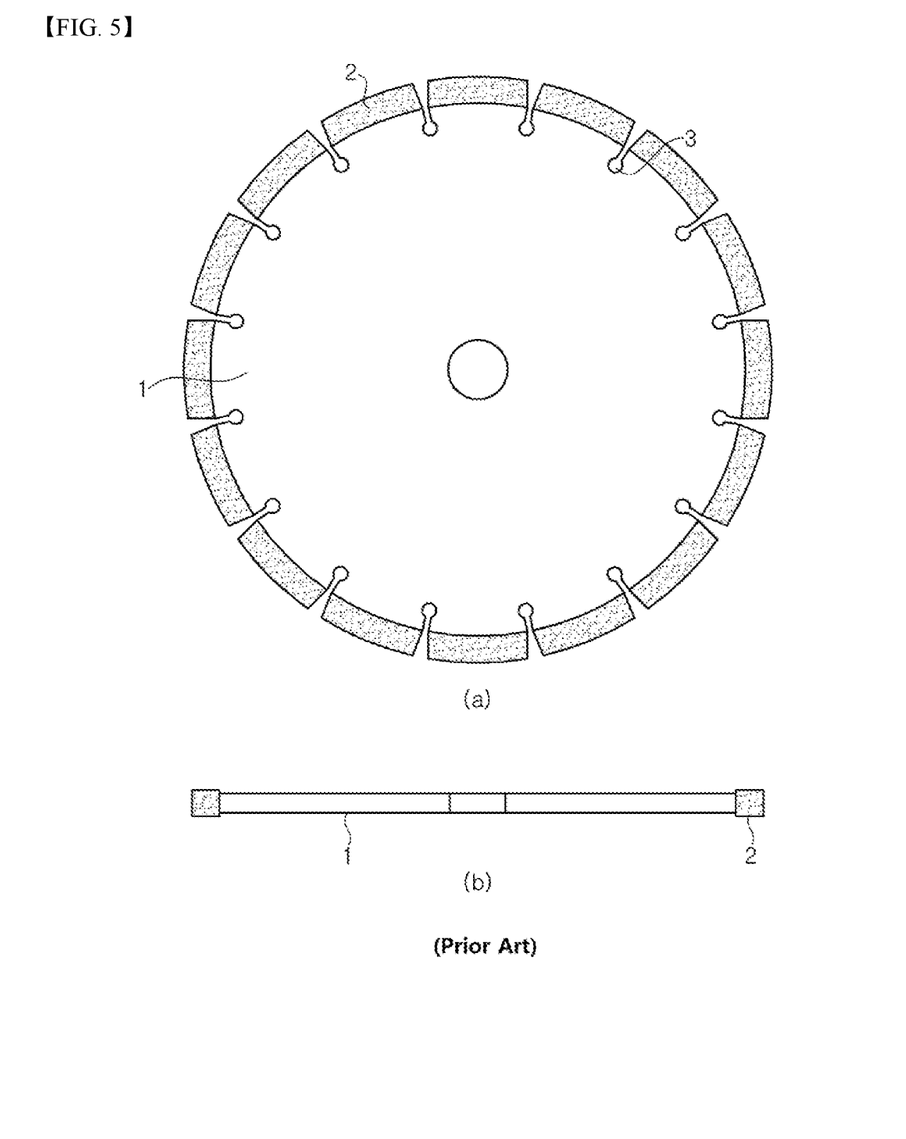
FIGS. 5 to 10 shows a variety of conventional saw blades.
Figure 6:
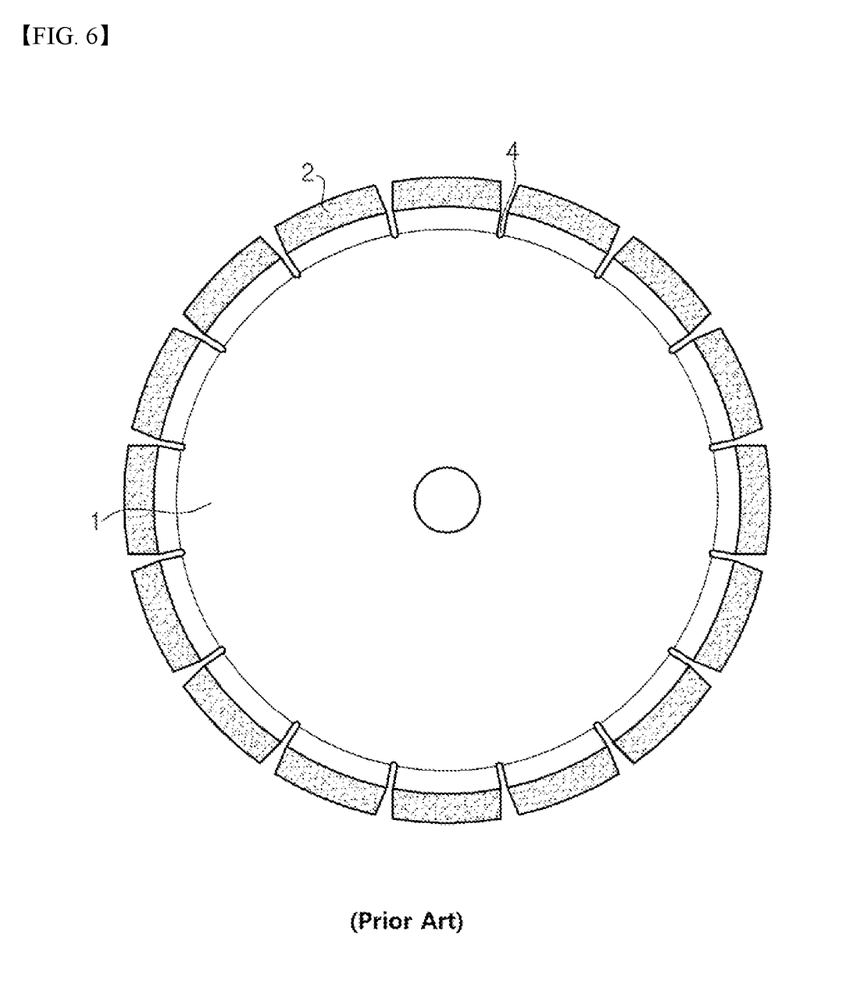
Figure 7:
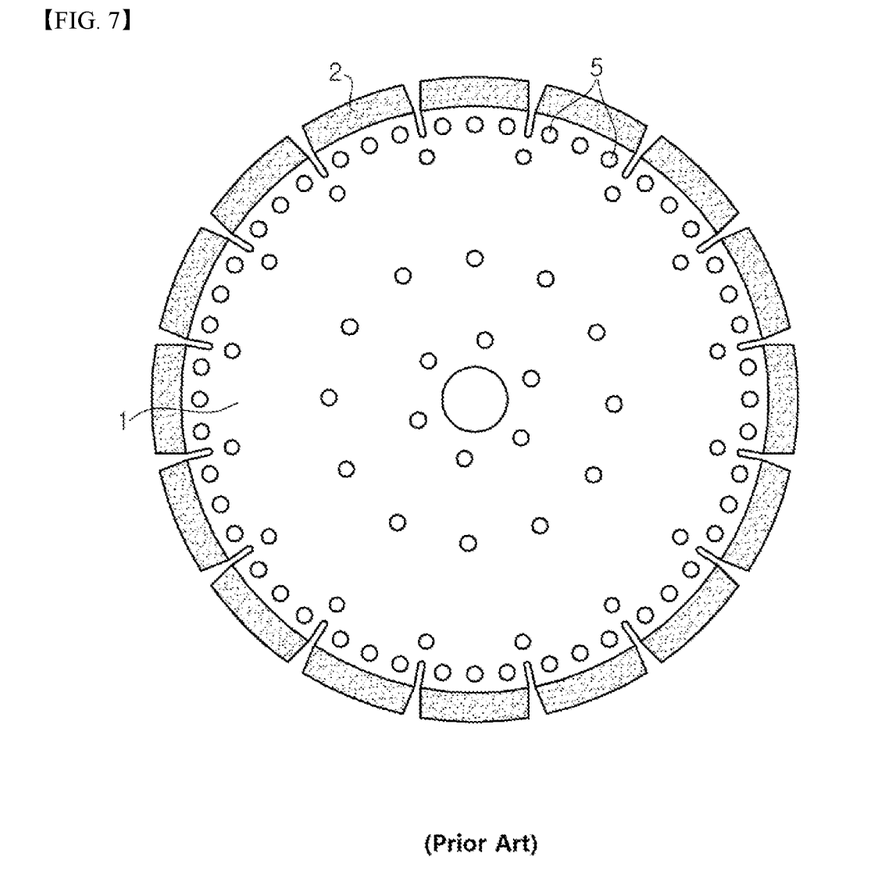
Figure 8:
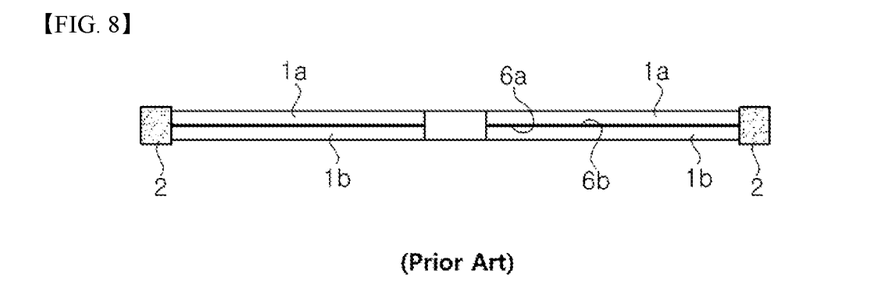
Figure 9:
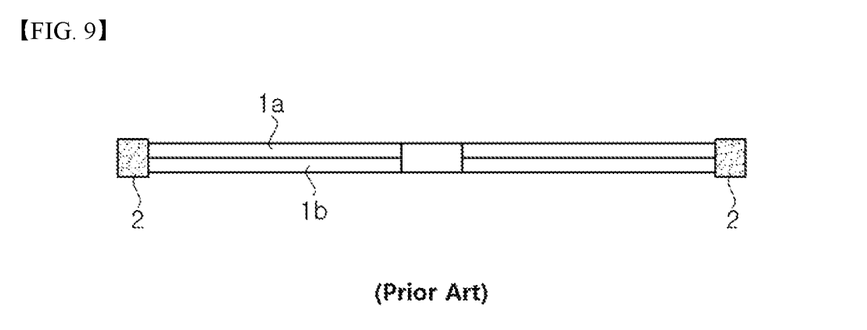

In a typical saw blade, a single disc 1 is used, as shown in FIGS. 5 and 6, or a pair of two discs 1a, 1b attached to each other through welding or an adhesive 5 (FIG. 7) is used, as shown in FIGS. 8 and 9.

In a sandwich shank-type saw blade including two discs 1a, 1b, a material having different acoustic impedance, for example, copper plates 6a, 6b, is interposed between the two discs to absorb noise generated during cutting.

Particularly, the aforementioned copper plates 6a, 6b can also effectively dissipate thermal energy generated upon absorption of noise by the sandwich shank, thereby providing both noise reduction and heat dissipation.

However, such a sandwich shank-type saw blade including the copper plates 6a, 6b interposed between the discs requires a complicated manufacturing process and a production cost thereof is 4 to 5 times that of a general saw blade.

Figure 10:
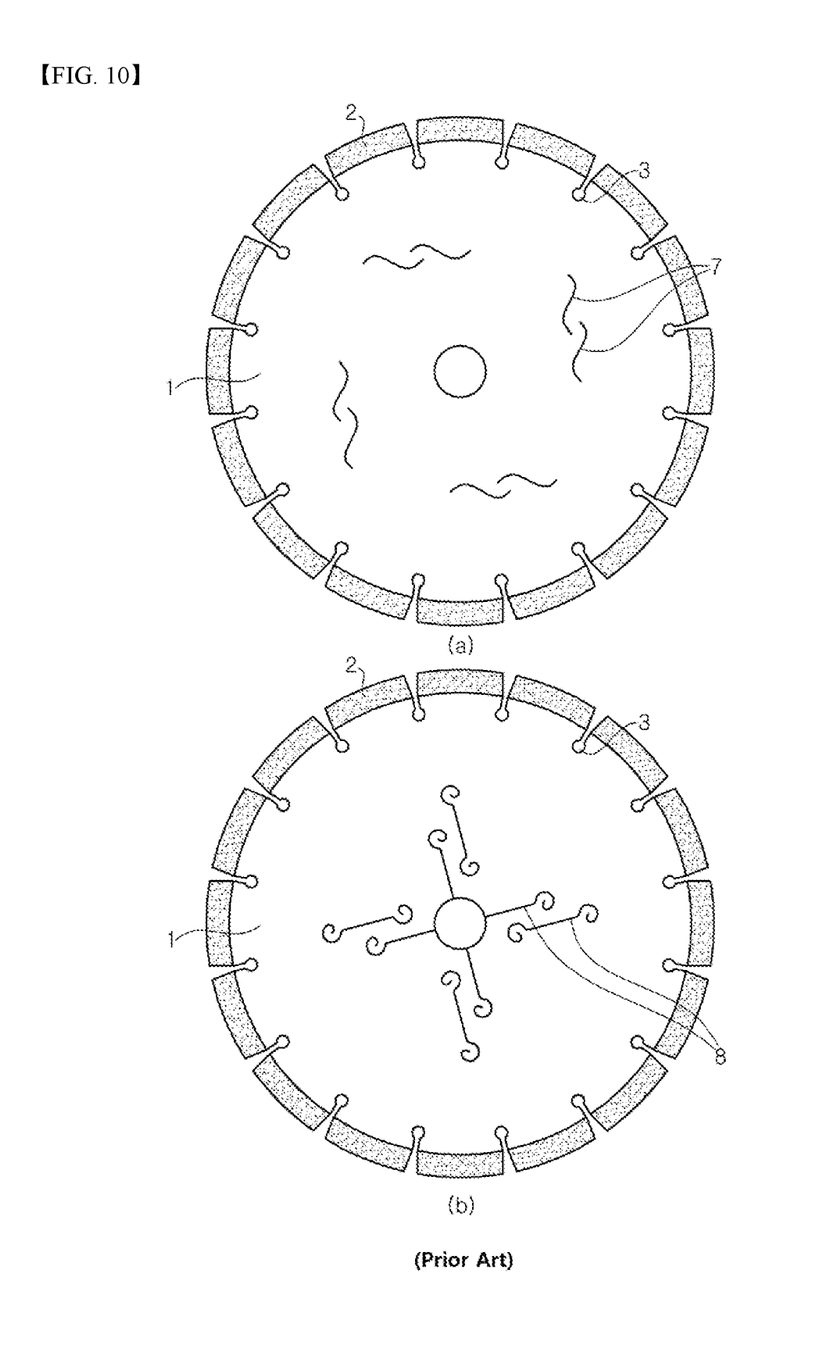

In addition, there has been proposed a detenso shank-type saw blade in which a specific pattern 7 or 8 is circumferentially or radially engraved in a single disc 1 by laser cutting or the like, as shown in FIG. 10, followed by filling the engraved pattern with a resin, whereby noise generated during cutting operations can be absorbed or blocked due to difference in acoustic impedance between the disc 1 and the resin.

However, such a detenso shank-type saw blade has a noise reduction rate more than 50% lower than that of a sandwich shank-type saw blade as described above, although the production cost thereof is relatively low as compared with the sandwich shank-type saw blade. In addition, the detenso shank-type saw blade does not include a heat dissipation member such as the copper plates 6a, 6b and thus exhibits poor heat dissipation performance.

Further, there has been proposed a saw blade in which slots are formed between plural sections of an outer circumference of a disc 1 to which plural segments 2 are attached, respectively, as shown in FIGS. 5 to 7 and 10.

Such slots 3, 4 serve to allow cooling water or air to flow between the segments 2 during cutting operations, thereby providing rapid cooling and to improve flexibility of the saw blade.

The shape of the slots 3, 4 has an effect on noise generation during cutting operation. The slots are basically divided into a K-shaped slot 3 (also referred to as "key shape") 3 and a U-shaped slot 4 depending on the shape.

Although the U-shaped slot 4 having a narrow width generates less cutting noise than the K-shaped slot 3, the disc 1 can suffer from cracking due to concentration of stress around an inner end of the U-shaped slot 4 during cutting of a high-strength workpiece or a workpiece inducing high impulse, such as a reinforced concrete.

Conversely, the K-shaped slot 3 has a larger size than the U-shaped slot 4 to provide stress distribution and thus is highly resistant to impulse during cutting operations. However, resonance takes place in the vicinity of the K-shaped slot 3, which becomes a cause of increased noise.

BRIEF SUMMARY

Embodiments of the present invention provide a saw blade having a noise and stress reduction structure which can reduce noise during cutting and have high heat dissipation efficiency with a relatively simple configuration while dispersing impact stress to suppress cracking.

In accordance one aspect of the present invention, a saw blade having a noise and stress reduction structure, comprising: a first unit including a pair of steel discs, each of which is provided with a front surface; a plurality of diamond segments equidistantly mounted along edges of the pair of steel discs with the front surfaces in contact with each other; and a second unit formed at the edges of the pair of steel discs between a pair of adjacent diamond segments and having partial patterns formed in opposite directions along circumferences of the pair of steel discs in contact with each other, respectively, to reduce noise and prevent cracking caused by concentration of stress during cutting by rotation of the first unit.

The first unit may further include a copper plating layer formed on each of the front surfaces of the pair of steel discs, and the diamond segments are mounted along the edges of the pair of steel discs with the copper plating layers in contact with each other.

The pair of steel discs may include a first disc having the front surface as a first front surface and a first back surface and a second disc having the front surface as a second front surface facing the first front surface and a second back surface, and the second unit is formed along edges of the first disc and the second disc.

The second unit may include portions formed along the edges of the first disc and the second disc respectively to overlap each other.

The copper plating layer may include: a first plating layer formed on the front surface of one of the pair of steel discs; and a second plating layer formed on the front surface of the other steel disc.

The second unit may include: plural overlapping patterns formed along an edge of each of the pair of steel discs to extend toward a center of each of the pair of steel discs such that each of the overlapping patterns formed along the edge of one of the steel discs overlaps a corresponding one of the overlapping patterns formed along the edge of the other steel disc; and plural unmatched patterns formed on each of the steel discs to extend from an end of the overlapping pattern such that each of the unmatched patterns of one of the steel discs is offset from a corresponding one of the unmatched patterns of the other steel disc, wherein the overlapping patterns and the unmatched patterns are formed on each of the pair of steel discs by cutting.

The second unit may include: plural overlapping patterns formed along an edge of each of the first disc and the second disc such that each of the overlapping patterns of the first disc overlaps a corresponding one of the overlapping patterns of the second disc; and plural unmatched patterns formed on each of the first disc and the second disc and each extending from an end of the overlapping pattern such that each of the unmatched patterns of the first disc is offset from a corresponding one of the unmatched patterns of the second disc.

Each of the overlapping patterns may include: a first straight slot formed in the first disc by cutting to extend from the edge of the first disc toward a center of the first disc to have a first width and a predetermined length; and a second straight slot formed by cutting in the second disc to extend from the edge of the second disc toward a center of the second disc to have a first width and a predetermined length and overlapping the first straight slot, and wherein each of the unmatched patterns extends from an inner end of each of the first straight slot and the second straight slot.

Each of the overlapping pattern may include: a third straight slot formed in the first disc by cutting to extend from the edge of the first disc to have a first width and a predetermined length; and a fourth straight slot formed in the second disc by cutting to extend from the edge of the second disc to have the first width and a predetermined length and overlapping the third straight slot, wherein each of the unmatched patterns extends from an inner end of each of the third straight slot and the fourth straight slot, and wherein each of the third straight slot and the fourth straight slot is inclined at a predetermined angle with respect to an imaginary line connecting the edge of each of the first disc and the second disc to the center of each of the first disc and the second disc.

With the first and second discs overlapped, the inner ends of the first straight slot and the second straight slot may be rounded in opposite directions, respectively, and each of the unmatched patterns extends from the rounded portion of each of the inner ends.

With the first and second discs overlapped, the inner ends of the third straight slot and the fourth straight slot may be rounded in opposite directions, respectively, and each of the unmatched patterns extends from the rounded portion of each of the inner ends.

Each of the unmatched pattern may include: a first extension slot formed in the first disc by cutting to extend from the rounded portion and having a second width and a circular or elliptical shape; and a second extension slot formed in the second disc by cutting to extend from the rounded portion and having the second width and a circular or elliptical shape, wherein a cutout portion of the first extension slot is blocked by the second front surface of the second disc and a cutout portion of the second extension slot is blocked by the first front surface of the first disc.

Each of the unmatched patterns may include: a third extension slot formed in the first disc to extend from the rounded portion and having a second width and a circular or elliptical shape; and a fourth extension slot formed in the second disc to extend from the rounded portion and having the second width and a circular or elliptical shape, wherein a cutout portion of the third extension slot is blocked by the second front surface of the second disc and a cutout portion of the fourth extension slot is blocked by the first front surface of the first disc.

Each of the unmatched patterns may include: a first extension slot formed in the first disc by cutting to extend counterclockwise from one side edge of inner ends of a pair of overlapping patterns straightly extending from the edges of the first disc and the second disc toward the centers of the first disc and the second disc, the first extension slot being formed in a circular or elliptical shape to have a second width by cutting; and a second extension slot formed in the second disc by cutting to extend clockwise from another side edge of the inner ends of the pair of overlapping patterns, the second extension slot being formed in a circular or elliptical shape to have the second width by cutting.

Each of the unmatched patterns may include: a third extension slot formed in the first disc to extend counterclockwise from one side edge of inner ends of a pair of overlapping patterns straightly extending from the edges of the first disc and the second disc, the third extension slot being formed in a circular or elliptical shape to have a second width by cutting; and a fourth extension slot formed in the second disc to extend clockwise from another side edge of the inner ends of the pair of overlapping patterns, the fourth extension slot being formed in a circular or elliptical shape to have the second width by cutting, and wherein each of the overlapping patterns is inclined at a predetermined angle with respect to an imaginary line connecting the edge of each of the first disc and the second disc to the center of each of the first disc and the second disc.

In accordance with another aspect of the present invention, a saw blade having a noise and stress reduction structure, including: a first unit including a pair of steel discs, each of which is provided with a front surface; a plurality of diamond segments equidistantly or non-equidistantly mounted along edges of the pair of steel discs with the front surfaces in contact with each other; and a second unit formed at the edges of the pair of steel discs between a pair of adjacent diamond segments and having partial patterns formed in opposite directions or different directions along circumferences of the pair of steel discs in contact with each other, respectively, to reduce noise and prevent cracking caused by concentration of stress during cutting by rotation of the first unit.

The first unit may further include a metal plating layer formed on at least one of the surfaces of the pair of metal discs facing each other.

According to embodiments of the present invention, the following effects can be achieved.

First, according to embodiments of the invention, the saw blade has a relatively simple structure including a first unit having a pair of stacked metal or steel discs and a plurality of segments, for example a plurality of diamond segments, and thus is easy to manufacture at low cost.

According to embodiments of the invention, the saw blade further includes a metal plating layer, for example, a copper plating layer, formed on at least one of the pair of metal or steel discs facing each other and thus can have better heat dissipation performance than that of a typical sandwich shank-type saw blade, which includes a copper plate interposed between two discs.

Particularly, according to embodiments of the invention, the copper plating layer having a different acoustic impedance from the pair of steel discs is sandwiched between the pair of steel discs, thereby improving absorption or blocking of noise due to the difference in acoustic impedance.

According to embodiments of the invention, the saw blade further includes a second unit formed between a pair of adjacent diamond segments, thereby effectively reducing or suppressing noise generated during cutting operations.

Particularly, the second unit is a slot having merits of typical slots, i.e., a U-shaped slot and a K-shaped slot (also referred to as 'key-shaped slot') and thus can prevent cracking due to stress concentration during cutting operations while reducing or suppressing resonance-induced noise.

DETAILED DESCRIPTION

The above and other aspects, features, and advantages of embodiments of the present invention will become apparent from the detailed description of the following embodiments in conjunction with the accompanying drawings.

It should be understood that the present invention is not limited to the following embodiments and may be embodied in different ways.

In addition, it should be understood that the embodiments are provided for complete disclosure and thorough understanding of the present invention by those skilled in the art.

And, the scope of the present invention is defined only by the claims.

Therefore, detailed description of well-known configuration elements, well-known operation and well-known technics will be omitted to avoid obscure interpretation of the present invention.

Like components will be denoted by like reference numerals throughout the specification, and the terms used (mentioned) herein are intended to illustrate the embodiments and are not to be construed in any way as limiting the present invention.

As used herein, the singular forms, "a," "an," and "the" are intended to encompass the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined herein, all terms including technical or scientific terms used herein have the same meanings as commonly understood by those skilled in the art to which the present invention pertains.

It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, embodiments of the present invention will be described with reference to the accompanying drawings.

Figure 1:
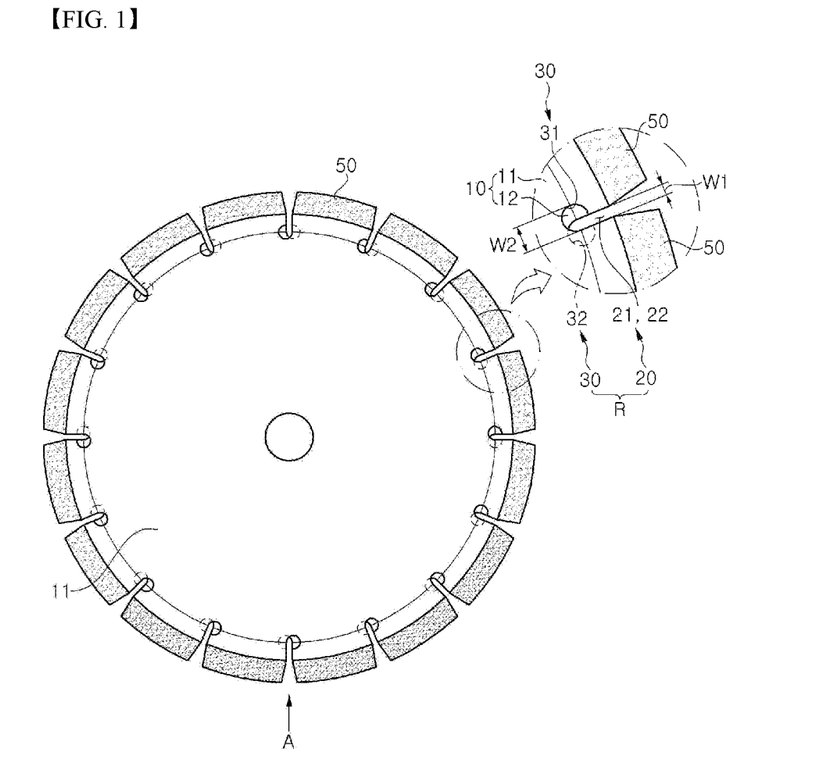
FIG. 1 is a schematic plan view of a saw blade having a structure capable of suppressing noise and stress concentration according to one embodiment of the present invention.
Figure 2:
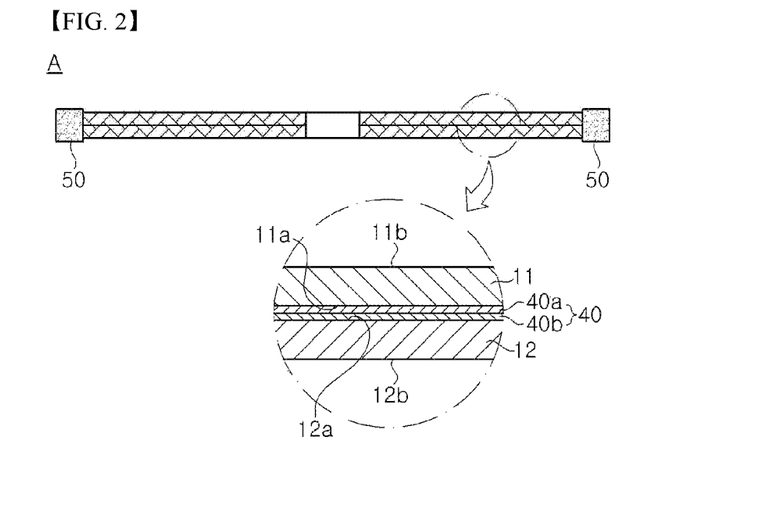
FIG. 2 is a schematic side view of the saw blade having a bonding structure capable of suppressing noise and stress concentration according to the embodiment of FIG. 1, as seen from viewpoint A of FIG. 1.
Figure 3:
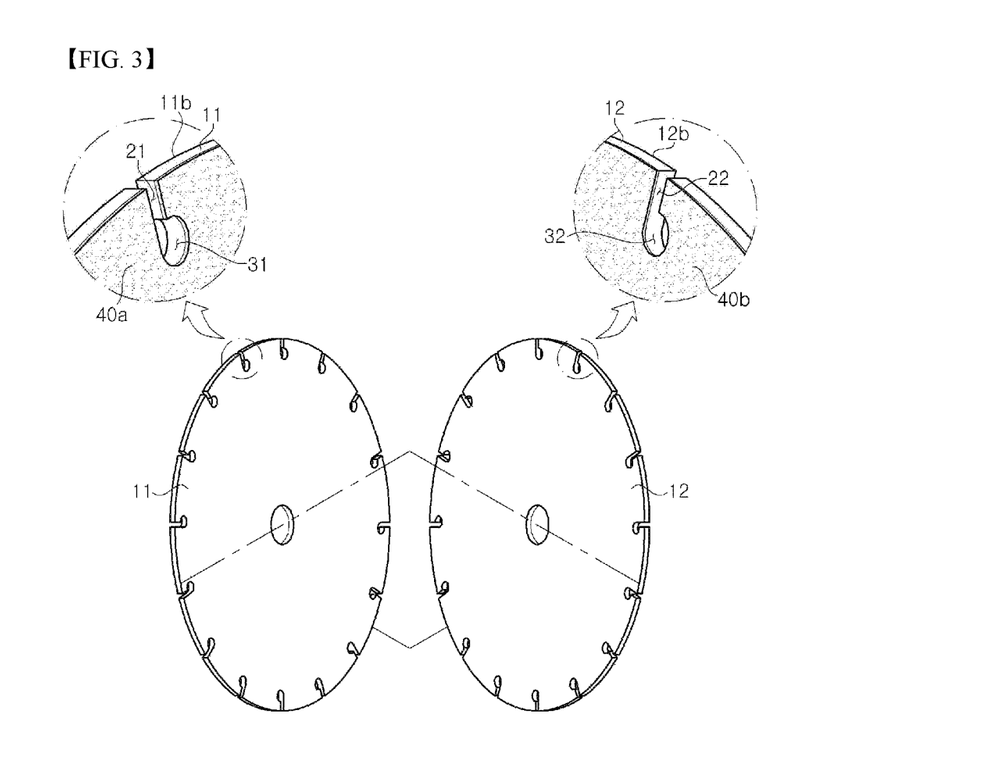
FIG. 3 is a schematic exploded perspective view of a first unit of the saw blade having a bonding structure capable of suppressing noise and stress concentration according to the embodiment of FIG. 1.

FIG. 1 is a schematic plan view of a saw blade having a structure capable of suppressing noise and stress concentration according to one embodiment of the present invention, FIG. 2 is a schematic side view of the saw blade having a structure capable of suppressing noise and stress concentration according to the embodiment of FIG. 1, as seen from viewpoint A of FIG. 1, and FIG. 3 is a schematic exploded perspective view illustrating a bonding structure of a main component (a first unit) of the saw blade having a structure capable of suppressing noise and stress concentration according to the embodiment of FIG. 1.

As shown, it is understood that an embodiment of the present invention is a structure provided with: a first unit 10 on which a plurality of segments 50 is mounted; and a second unit R provided to the first unit 10. For example, the plurality of segments 50 may be diamond segments, CBN segments, PCD segments, or abrasive segments. In the following description, a plurality of diamond segments 50 will be illustrated by way of example.

The first unit 10 includes a pair of metal discs 11, 12 formed of, for example, steel and facing each other and provides a space for mounting the diamond segments 50 and the second unit R, which will be described below. In the following description, steel discs 11, 12 will be illustrated by way of example. The diamond segments 50 are a plurality of members equidistantly mounted along edges of the pair of steel discs 11, 12 contacting each other face-to-face and a portion to cut a workpiece (not shown).

In addition, the second unit R is formed at the edges of the pair of steel discs 11, 12 between a pair of adjacent diamond segments 50 to reduce noise during cutting by rotation of the first unit 10.

As shown in an enlarged circle of FIG. 1, the second unit R is provided with patterns 30 formed in opposite directions along the circumferences of the steel discs 11, 12 contacting each other, respectively, thereby preventing cracking due to concentration of stress during cutting while suppressing or blocking resonance-induced noise.

Although aspects of the present invention have been described with reference to the embodiment as set forth above, it should be understood that various modifications can be made as follows.

First, a saw blade according to embodiments of the present invention may further include a plating layer 40 formed on at least one of surfaces 11a, 12a of the steel discs 11, 12 facing each other. Although the plating layer 40 may be formed of various metals, it is desirable in terms of effective noise reduction and heat dissipation that the plating layer be a copper plating layer. In the following description, the copper plating layer 40 will be illustrated by way of example. The copper plating layer may have a thickness of, for example, 0.1 μm to 50 μm. It is more advantageous to form the copper plating layer on both of the surfaces 11a, 12a of the steel discs 11, 12 facing each other in terms of balance, noise reduction, and heat dissipation.

Due to use of the copper plating layer 40, the saw blade according to embodiments of the present invention can have improved heat dissipation performance and can be manufactured through a relatively simple process at a relatively low cost, as compared with a typical sandwich shank-type saw blade including a copper plate interposed between two discs.

In addition, since the copper plating layer 40 having a different acoustic impedance from the steel discs 11, 12 is interposed between the pair of the steel discs to form a stack, noise generated during cutting operations can be partially absorbed or blocked by the copper plating layer 40.

Referring to FIG. 3, the pair of steel discs 11, 12 may include: a first disc 11 having a first front surface 11a and a first back surface 11b; and a second disc 12 having a second front surface 12a facing the first front surface 11a and a second back surface 12b.

In the embodiment shown in FIGS. 1 to 3, the copper plating layer 40 is formed on each of the first front surface 11a and the second front surface 12a and the second unit R is formed along the edges of the first disc 11 and the second disc 12 (See FIGS. 1 and 2).

Here, the second unit R may include portions formed along the edges of the first disc 11 and the second disc 12, respectively, to overlap each other.

Referring to the enlarged portion of FIG. 2, the copper plating layer 40 may include a first plating layer 40a formed on the front surface of one of the steel discs 11, 12 and a second plating layer 40b formed on the front surface of the other steel disc.

In other words, the copper plating layer 40 may include a first plating layer 40a formed on the first front surface 11a of the first disc 11 and a second plating layer 40b formed on the second front surface 12a of the second disc 12.

Thus, the saw blade according to embodiments of the present invention may be manufactured through a simple process in which the first and second plating layers 40a, 40b are formed on the first and second front surfaces 11a, 12a of the first and second discs 11, 12, respectively, by electroplating or the like, followed by formation of the second unit R described below by cutting, and then the first and second discs 11, 12 are attached to each other, followed by mounting of the diamond segments 50 thereon. Here, the first and second discs 11, 12 having the plating layers 40a, 40b formed thereon, respectively, may be attached to each other by spot welding, which is commonly used in a typical sandwiched shank-type saw blade, and additionally or alternatively through an adhesive.

The second unit R includes: plural overlapping patterns 20 formed along an edge of each of the pair of steel discs 11, 12 such that each of the overlapping patterns formed along the edge of one of the steel discs overlaps a corresponding one of the overlapping patterns formed along the edge of the other steel disc; and plural unmatched patterns 30 formed on each of the steel discs 11, 12 to extend from ends of the overlapping patterns 20 such that each of the unmatched patterns of one of the steel discs is offset from a corresponding one of the unmatched patterns of the other steel disc.

Here, the overlapping pattern 20 and the unmatched pattern 30 are formed on each of the pair of steel discs 11, 12 by cutting.

Specifically, the plural overlapping patterns 20 are formed along the edge of each of the first and second discs 11, 12 and each extends from the edge toward the center of each of the first and second discs 11, 12 such that each of the overlapping patterns 20 of the first disc 11 overlaps a corresponding one of the overlapping patterns 20 of the second disc 12.

In addition, the unmatched patterns 30 are formed on each of the first and second discs 11, 12 and each extends from the end of the overlapping pattern 20 such that each of the unmatched patterns of the first disc is offset from a corresponding one of the unmatched patterns of the second disc 12.

Referring to FIGS. 1 and 3 more in detail, the overlapping patterns 20 includes a first straight slot 21 and a second straight slot 22.

The first straight slot 21 is formed in the first disc 11 by cutting to extend from the edge of the first disc 11 toward the center of the first disc to have a first width W1 and a predetermined length.

The second straight slot 21 is formed in the second disc 12 by cutting to extend from the edge of the second disc 12 toward the center of the second disc to have a first width W1 and a predetermined length and overlaps the first straight slot 21.

Thus, the unmatched pattern 30 described below is formed from an inner end of each of the first straight slot 21 and the second straight slot 22.

With the first and second discs 11, 12 overlapped, inner ends of the first straight slot 21 and the second straight slot 22 are rounded in opposite directions, respectively, such that the unmatched pattern 30 extends from a rounded portion of each of the inner ends.

The unmatched pattern 30 may include a first extension slot 31 and a second extension slot 32.

The first extension slot 31 is formed in the first disc 11 by cutting to extend counterclockwise from one side edge of inner ends of a pair of overlapping patterns 20 straightly extending from the edges of the first disc 11 and the second disc 12 toward the centers of the first disc 11 and the second disc 12, and is formed to have a second width W2 in a circular or elliptical shape.

The second extension slot 32 is formed in the second disc 12 by cutting to extend clockwise from another side edge of the inner ends of the pair of overlapping patterns 20 and has a circular or elliptical shape having the second width W2.

In other words, the first extension slot 31 of the unmatched pattern 30 is formed to have a second width W2 in a circular or elliptical shape in the first disc 11 and extends from the rounded portion of the first straight slot 21 to be biased to one side eccentrically with respect to the center of the first straight slot 21.

In addition, the second extension slot 32 of the unmatched pattern 30 is formed to have a second width W2 in a circular or elliptical shape in the second disc 12 and extends from the rounded portion of the second straight slot 22 to be biased to another side eccentrically with respect to the center of the second straight slot 22.

Herein, the structure wherein the first extension slot is biased to one side eccentrically with respect to the center of the first straight slot 21 and the second extension slot is biased to another side eccentrically with respect to the center of the second straight slot 22 means that a pattern as shown in the enlarged circle of FIG. 1 (solid line and broken line) is formed when the first and second discs 11, 12 are overlapped.

In this embodiment, a cutout portion of the first extension slot 31 may be blocked by the second front surface 12a (or the plating layer 40b) of the second disc 12 and a cutout of the second extension slot 32 may be blocked by the first front surface 11a (or the plating layer 40a) of the first disc 12. Thus, the saw blade according to the present invention can prevent increase in resonance-induced noise during cutting by rotation of the first and second discs 11, 12 due to a typical K-shaped slot (also referred to as 'key-shaped slot'), which has a larger size than a typical U-shaped slot.

Preferably, the second width W2 is larger than the first width W1 to prevent cracking of the first and second discs 11, 12 caused by stress concentration.

Next, a process of manufacturing the saw blade having a noise and stress reduction structure according to the present invention will be briefly described.

First, the first and second discs 11, 12 are cut out, followed by formation of the first and second plating layers 40a, 40b on the first and second front surfaces 11a, 12a of the first and second discs 11, 12, respectively, and then the overlapping patterns 20 and the unmatched patterns 30 are formed by cutting. Here, each of the first and second extension slots 31, 32 of the unmatched pattern 30 may be formed in a different shape (e.g., a golf club head-like shape) rather than a circular shape as shown in the drawings.

After the overlapping patterns 20 and the unmatched patterns 30 are formed in the first and second discs 11, 12, the first and second discs 11, 12 are overlapped such that the first and second plating layers 40a, 40b face each other, thereby forming a pattern of the second unit R as shown in the enlarged portion of FIG. 1.

Figure 4:
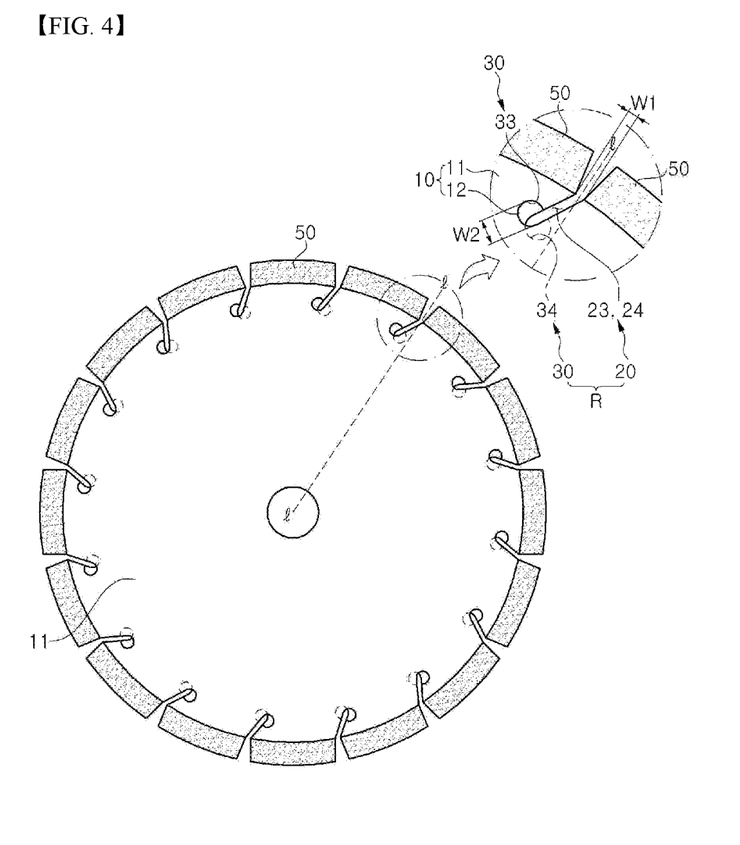
FIG. 4 is a schematic plan view of a saw blade having a structure capable of suppressing noise and stress concentration according to another embodiment of the present invention.

Although the saw blade is shown as including the second unit R including the overlapping patterns 20 and the unmatched patterns 30 as described above, it should be understood that the present invention is not limited thereto and the saw blade may include a second unit R including an overlapping pattern 20 as shown, for example, in FIG. 4.

Referring to FIG. 4, the overlapping pattern 20 includes a third straight slot 23 and a fourth straight slot 24.

The third straight slot 23 is formed in the first disc 11 by cutting to extend from the edge of the first disc to have a first width W1 and a predetermined length.

The fourth straight slot 24 is formed in the second disc 12 by cutting to extend from the edge of the second disc to have the first width W1 and a predetermined length and overlaps the third straight slot 23.

Thus, the unmatched pattern 30 described below extends from an inner end of each of the third straight slot 23 and the fourth straight slot 24.

In addition, each of the third straight slot 23 and the fourth straight slot 24 is inclined at a predetermined angle with respect to an imaginary line 1 connecting the edge of each of the first and second discs 11, 12 to the center of each of the first and second discs 11, 12, such that rotation resistance can be reduced to a certain extent when the first unit 10 is rotated for cutting.

With the first and second discs 11, 12 overlapped, the inner ends of the third straight slot 23 and the fourth straight slot 24 are rounded in opposite directions, respectively, such that the unmatched pattern 30 extends from a rounded portion of each of the inner ends.

The unmatched pattern 30 may include a third extension slot 33 and a fourth extension slot 34.

The third extension slot 33 is formed in the first disc 11 by cutting to extend counterclockwise from one side edge of inner ends of a pair of overlapping patterns 20 straightly extending from the edges of the first disc 11 and the second disc 12, and is formed to have a second width W2 in a circular or elliptical shape.

The fourth extension slot 34 is formed in the second disc 12 by cutting to extend clockwise from another side edge of the inner ends of the pair of overlapping patterns 20 and is formed to have the second width W2 in a circular or elliptical shape.

The overlapping pattern 20 is inclined at a predetermined angle with respect to an imaginary line 1 connecting the edge of each of the first and second discs 11, 12 to the center of each of the first and second discs 11, 12.

In other words, the third extension slot 33 of the unmatched pattern 30 is formed in the first disc 11 to have the second width W2 in a circular or elliptical shape and extends from the rounded portion of the third straight slot 23 to be biased to one side eccentrically with respect to the center of the third straight slot 23.

In addition, the fourth extension slot 34 of the unmatched pattern 30 is formed in the second disc 12 to have the second width W2 in a circular or elliptical shape and extends from the rounded portion of the fourth straight slot 24 to be biased to another side eccentrically with respect to the center of the fourth straight slot 24.

Herein, the structure wherein the third extension slot is biased to one side eccentrically with respect to the center of the third straight slot 23 and the fourth extension slot is biased to another side eccentrically with respect to the center of the fourth straight slot 24 means that a pattern as shown in the enlarged portion of FIG. 4 (solid line and broken line) is formed when the first and second discs 11, 12 are overlapped.

In this embodiment, a cutout portion of the third extension slot 33 may be blocked by the second front surface 12a (or the plating layer 40b, FIG. 2) of the second disc 12 and a cutout of the fourth extension slot 34 may be blocked by the first front surface 11a (or the plating layer 40a, FIG. 2) of the first disc 12. Thus, the saw blade according to the present invention can prevent increase in resonance-induced noise during cutting by rotation of the first and second discs 11, 12 due to a typical K-shaped slot, which has a larger size than a typical U-shaped slot.

Preferably, the second width W2 is larger than the first width W1 to prevent cracking of the first and second discs 11, 12 due to stress concentration.

A test for comparing degrees of noise reduction of the saw blade having a noise and stress reduction structure according to embodiments of the present invention and a typical saw blade was conducted.

Specifically, in a workplace where an average noise level was 75 dB, a noise gauge was placed at a point separated by a distance of 1.5 m from a table saw equipped with each of the saw blades, and then degrees of noise increase were compared during idling for a certain period of time or cutting of a workpiece.

Here, as the workpiece, a concrete piece having a size of 40 mm×400 mm×400 mm (thickness×width×length) was used.

Using the typical saw blade and the saw blade according to an embodiment of the present invention, idling and cutting were each performed 5 times, and a noise level during idling, a noise level at the start of cutting, a noise level at the end of cutting, and a peak noise level during cutting were measured, followed by averaging the measured values.

Test results are shown in Tables 1 and 2. Here, Table 1 shows experimental data of the conventional saw blade and Table 2 shows experimental data of the saw blade according to an embodiment of the present invention.

TABLE 1

| Conventional saw blade | Test time (sec) | Idling (dB) | Start (dB) | End (dB) | Peak (dB) |
| --- | --- | --- | --- | --- | --- |
| 1 | 24.47 | 93.2 | 100.7 | 104.5 | 106.5 |
| 2 | 22.53 | 93.8 | 101.9 | 104.2 | 105.3 |
| 3 | 23.56 | 93.6 | 102.1 | 104.3 | 106.3 |
| 4 | 24.96 | 93.7 | 102.5 | 103.7 | 105.9 |
| 5 | 27.25 | 93.6 | 103.1 | 103.4 | 105.8 |
| Average | 24.55 | 93.58 | 102.06 | 104.02 | 105.96 |

TABLE 2

| Saw blade according to the present invention | Test time (sec) | Idling (dB) | Start (dB) | End (dB) | Peak (dB) |
| --- | --- | --- | --- | --- | --- |
| 1 | 17.53 | 93.7 | 99.5 | 101.1 | 101.3 |
| 2 | 18.29 | 93.8 | 97.5 | 99.5 | 100.7 |
| 3 | 19.90 | 93.9 | 99.5 | 99.2 | 100.5 |
| 4 | 23.28 | 93.6 | 99.3 | 100.8 | 101.7 |
| 5 | 22.97 | 93.9 | 99.5 | 98.9 | 101.4 |
| Average | 20.39 | 93.78 | 99.06 | 99.90 | 101.12 |

As shown in Tables 1 and 2, it was confirmed that the saw blade having a noise and stress reduction structure according to the embodiment of the present invention exhibited a considerably high degree of noise reduction, as compared with the conventional saw blade.

Therefore, it can be appreciated that the saw blade having a noise and stress reduction structure according to embodiments of the present invention can reduce noise during cutting and have high heat dissipation efficiency with a relatively simple configuration while dispersing impact stress to suppress cracking.

It should be understood that various modifications, changes, alterations, and equivalent embodiments can be made by those skilled in the art without departing from the spirit and scope of the invention. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A saw blade, comprising:
a pair of steel discs, each of which is provided with a front surface, the front surfaces of the pair of steel discs oriented toward each other;
a plurality of diamond segments equidistantly mounted along edges of the pair of steel discs; and
a plurality of noise and stress reduction structures, each noise and stress reduction structure formed at the edges of the pair of steel discs between a respective pair of adjacent diamond segments, and each noise and stress reducing structure comprising a pair of opposing and partially overlapping cutouts in the pair of steel discs with a respective portion of each cutout being formed in a direction opposite of the other to reduce noise and prevent cracking caused by concentration of stress during cutting by rotation of the saw blade.

2. The saw blade according to claim 1, wherein a respective copper plating layer is formed on each of the front surfaces of the pair of steel discs, and wherein the copper plating layers are in contact with each other.

3. The saw blade according to claim 1, wherein the pair of steel discs includes a first disc having the front surface as a first front surface and a first back surface and a second disc having the front surface as a second front surface facing the first front surface of the first disc and a second back surface, and wherein the plurality of noise and stress reduction structures are formed along edges of the first disc and the second disc.

4. The saw blade according to claim 3, wherein each of the pair of opposing and partially overlapping cutouts includes a first cutout and a second cutout formed along the edges of the first steel disc and the second steel disc respectively, and wherein the first cutout and the second cutout partially overlap each other to form an overlapping cutout region that extends completely through the saw blade.

5. The saw blade according to claim 4, wherein the overlapping cutout region of each pair of opposing and partially overlapping cutouts extends toward a center of the saw blade, and wherein, for each of the pair of opposing and partially overlapping cutouts, a respective non-overlapping region of the first and second cutouts extends from an end of the overlapping cutout region in a direction opposite of the other such that each non-overlapping region is offset from the other.

6. The saw blade according to claim 4, wherein a non-overlapping portion of the first cutout of the first steel disc is offset from a non-overlapping portion of the second cutout of the second steel disc.

7. The saw blade according to claim 6, wherein an overlapping portion of the first cutout comprises a first straight slot formed in the first steel disc by cutting to extend from the edge of the first steel disc toward a center of the first steel disc to have a first width and a predetermined length, wherein an overlapping portion of the second cutout comprises a second straight slot formed by cutting in the second steel disc to extend from the edge of the second steel disc toward a center of the second steel disc to have a first width and a predetermined length and overlapping the first straight slot, wherein the non-overlapping portion of the first cutout extends from an inner end of the first straight slot, and wherein the non-overlapping portion of the second cutout extends from an inner end of the second straight slot.

8. The saw blade according to claim 6, wherein an overlapping portion of the first cutout comprises a first straight slot formed in the first steel disc by cutting to extend from the edge of the first steel disc to have a first width and a predetermined length, wherein an overlapping portion of the second cutout comprises a second straight slot formed in the second steel disc by cutting to extend from the edge of the second steel disc to have the first width and a predetermined length and overlapping the first straight slot, wherein the non-overlapping portion of the first cutout extends from an inner end of the first straight slot, wherein the non-overlapping portion of the second cutout extends from an inner end of the second straight slot, and wherein each of the first straight slot and the second straight slot is inclined at a predetermined angle with respect to an imaginary line connecting the edge of each of the first steel disc and the second steel disc to the center of each of the first steel disc and the second steel disc.

9. The saw blade according to claim 7, wherein, with the first and second steel discs overlapped, the inner ends of the first straight slot and the second straight slot are rounded in opposite directions, respectively, and each of the non-overlapping portions of the first and second cutouts extends from the rounded portion of each of the inner ends.

10. The saw blade according to claim 8, wherein, with the first and second steel discs overlapped, the inner ends of the first straight slot and the second straight slot are rounded in opposite directions, respectively, and each of the non-overlapping portions of the first and second cutouts extends from the rounded portion of each of the inner ends.

11. The saw blade according to claim 9, wherein the non-overlapping portion of the first cutout comprises a first extension slot formed in the first steel disc by cutting to extend from the rounded portion of the first straight slot and having a second width and a circular or elliptical shape, wherein the non-overlapping portion of the second cutout comprises a second extension slot formed in the second steel disc by cutting to extend from the rounded portion of the second straight slot and having a second width and a circular or elliptical shape, and wherein a portion of the first extension slot is blocked by the second front surface of the second steel disc and a portion of the second extension slot is blocked by the first front surface of the first steel disc.

12. The saw blade according to claim 10, wherein the non-overlapping portion of the first cutout comprises a first extension slot formed in the first steel disc to extend from the rounded portion of the first straight slot and having a second width and a circular or elliptical shape, wherein the non-overlapping portion of the second cutout comprises a second extension slot formed in the second steel disc to extend from the rounded portion of the second straight slot and having the second width and a circular or elliptical shape, and wherein a portion of the first extension slot is blocked by the second front surface of the second steel disc and a portion of the second extension slot is blocked by the first front surface of the first steel disc.

13. The saw blade according to claim 6, wherein the non-overlapping portion of the first cutout comprises a first extension slot formed in the first steel disc by cutting to extend counterclockwise from one side edge of the inner end of the first straight slot, the first extension slot being formed in a circular or elliptical shape to have a second width by cutting, and wherein the non-overlapping portion of the second cutout comprises a second extension slot formed in the second steel disc by cutting to extend clockwise from a side edge of the inner end of the second straight slot, the second extension slot being formed in a circular or elliptical shape to have the second width by cutting.

14. The saw blade according to claim 6, wherein the non-overlapping portion of the first cutout comprises a first extension slot formed in the first steel disc to extend counterclockwise from one side edge of the inner end of the first straight slot, the first extension slot being formed in a circular or elliptical shape to have a second width by cutting, and wherein the non-overlapping portion of the second cutout comprises a second extension slot formed in the second steel disc to extend clockwise from a side edge of the inner end of the second straight slot, the second extension slot being formed in a circular or elliptical shape to have the second width by cutting, and wherein the overlapping cutout region is inclined at a predetermined angle with respect to an imaginary line connecting the edge of each of the first steel disc and the second steel disc to the center of each of the first steel disc and the second steel disc.

* * * * *